April 14, 1953  F. W. LAWRENCE ET AL  2,634,571
ROTARY HINGED DISK TYPE MOWER
Filed May 7, 1951  2 SHEETS—SHEET 1
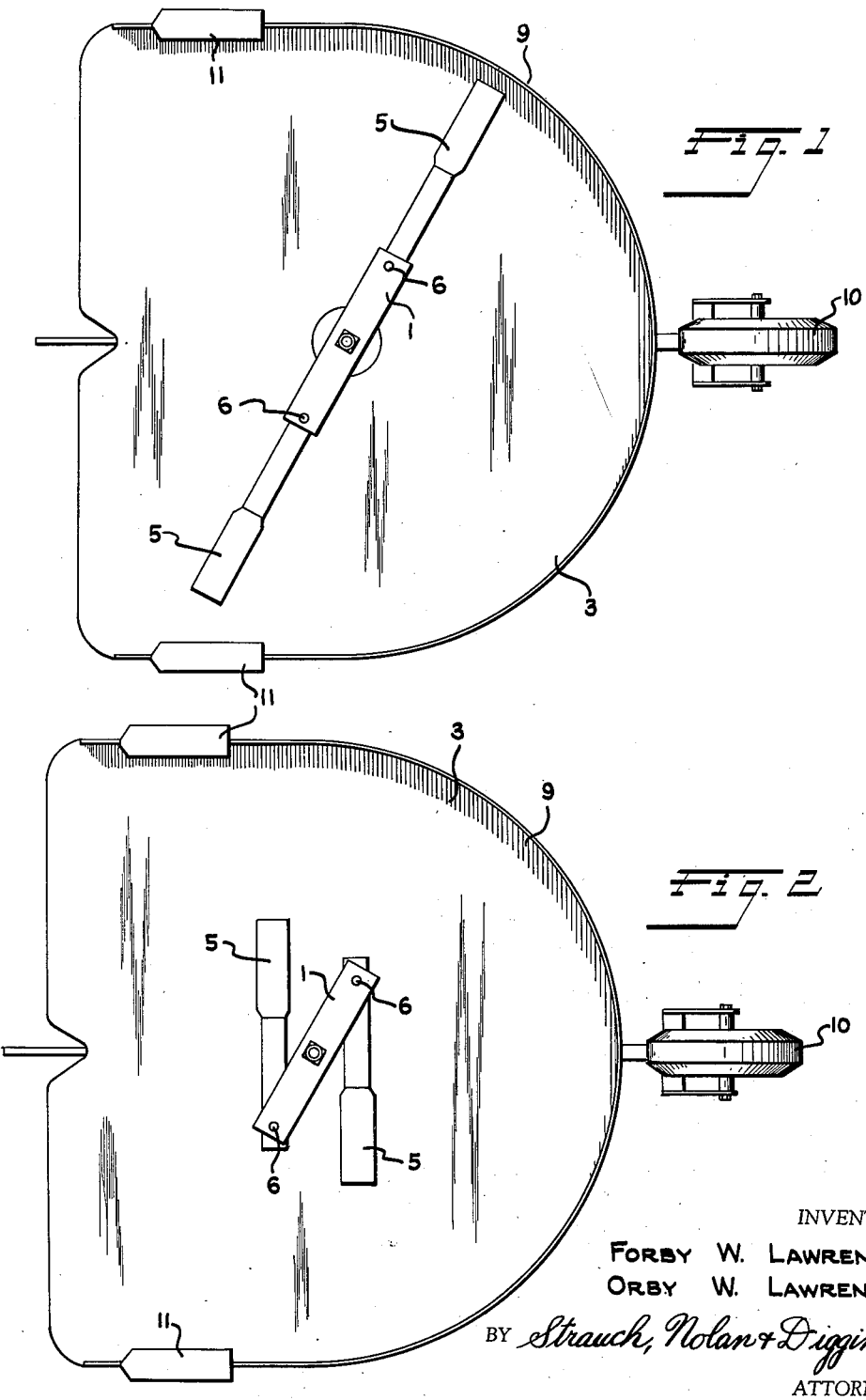
INVENTORS
FORBY W. LAWRENCE
ORBY W. LAWRENCE
BY Strauch, Nolan & Diggins
ATTORNEYS April 14, 1953
F. W. LAWRENCE ET AL
2,634,571
ROTARY HINGED DISK TYPE MOWER
Filed May 7, 1951
2 SHEETS—SHEET 2
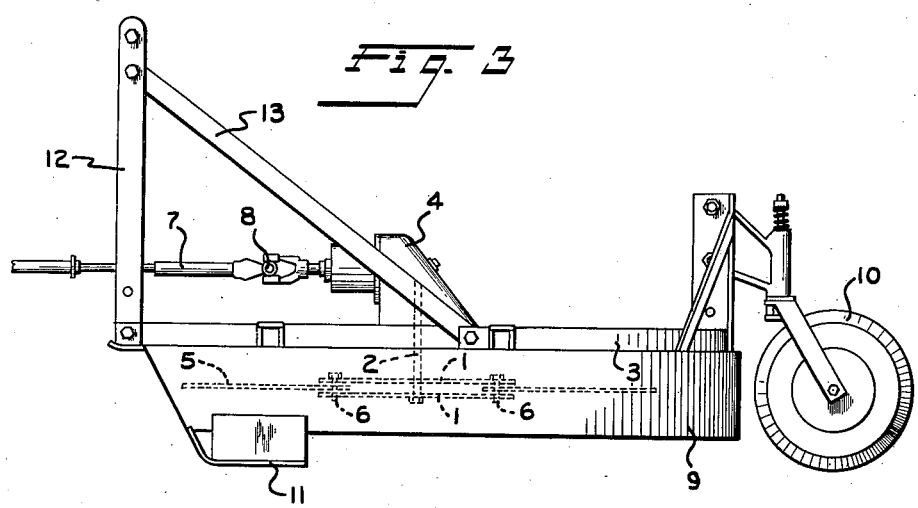
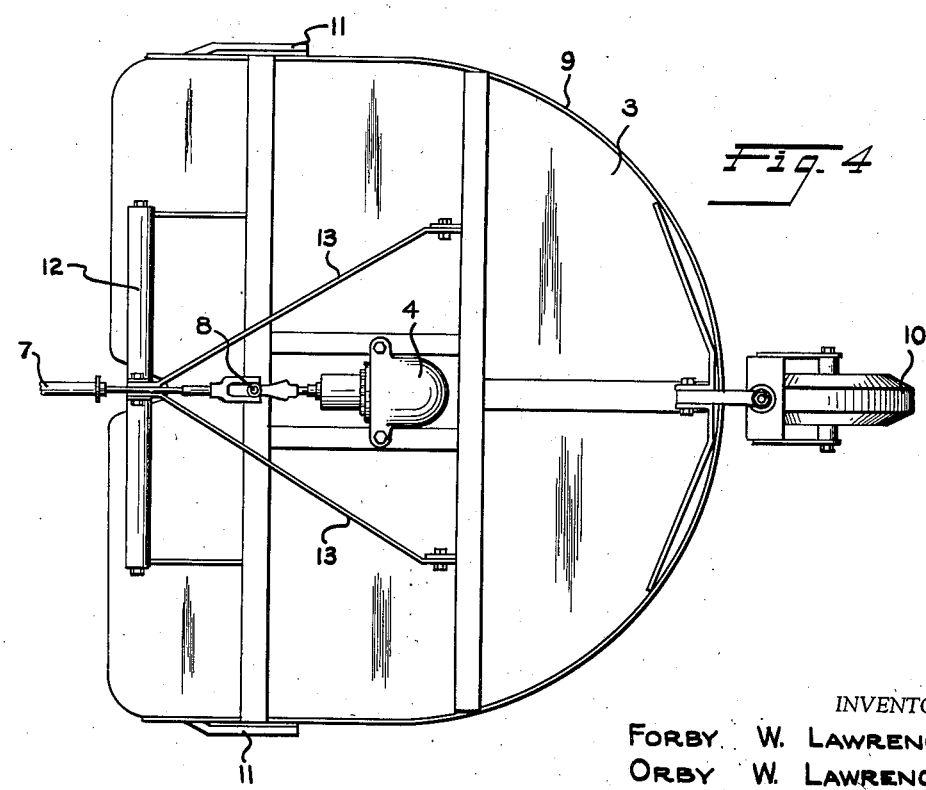
INVENTORS
FORBY W. LAWRENCE
ORBY W. LAWRENCE
BY *Strauch, Nolan & Diggins*
ATTORNEYS

Patented Apr. 14, 1953

2,634,571

UNITED STATES PATENT OFFICE 2,634,571

ROTARY HINGED DISK TYPE MOWER

Forby W. Lawrence, Selma, and Orby W. Lawrence, Jones, Ala.

Application May 7, 1951, Serial No. 224,982

2 Claims. (Cl. 56—25.4)

This invention relates to a cutting and shredding machine, and more particularly relates to a machine for cutting vegetable stubs and the like and subjecting them to a shredding action, as more particularly described hereinafter.

While the present invention is not necessarily confined to its use it is particularly adapted to the shredding of all kinds of stalks remaining after harvest of various farm crops such as cotton, corn, cane, etc. It is very efficient in cleaning up land infested with heavy growths of weeds, briars and even bushes or small trees that have a growth of trunk or stalk up to as much as three inches in diameter. In this particular the cutting machine comprising our invention cuts all weeds, vines, stalks, etc., and subjects them to a shredding action before they pass out of and behind the machine.

Generally our invention consists of rotatable, hinged blades confined in a cutter housing. The cutting blades are partially enclosed on three sides and the top, whereby, the ground forming the bottom of said enclosure, vegetation is subjected to the action of the cutting blades until shredded or cut into pieces small enough to pass out of the enclosure through the space between the housing and the ground. The blades of our novel machine are pivotally mounted on bars which are attached in fixed relationship to a single vertical rotating shaft so that the blades are radially extended by centrifugal force during normal operation, but can fall back and pass upon encountering rocks, stumps, etc. too hard or too large for cutting.

The features of our invention are set forth in a preferred form in the drawings wherein:

Figure 1 is a bottom plan view of an apparatus embodying our invention wherein the cutting blades are extended;

Figure 2 is a bottom plan view wherein the cutting blades are folded;

Figure 3 is a side elevation of an apparatus embodying our invention; and

Figure 4 is a top plan view.

In the form disclosed in these drawings, our invention consists of two blade holders 1 rigidly connected to a vertical shaft 2, said shaft extending through the top cover 3 to a gear box 4 mounted on the upper side of the top cover. Two blades 5 are pivotally connected between the blade holders by means of bolts 6 in such a manner as to enable the bladed ends to swing freely in an arc about the said bolts. Such an arrangement permits the blades to become extended (Figure 1) upon the application of centrifugal force through turning of the vertical shaft, while at the same time permitting the blades to assume a folded position (Figure 2) should they strike an obstruction while in operation, thus preventing damage and the consequent expense of replacement.

Rotary motion is supplied to the vertical shaft 2 through the gear box 4 by means of a drive shaft 7 equipped with a universal joint 8. Power can be applied to the drive shaft by any appropriate means such as by power take-off on a conventional farm tractor.

The cutter mechanism consisting of the free swinging blades and the blade holders is enclosed around both sides and the rear within a cutter housing 9, said housing being positioned outside the arc of rotation of the blades when said blades are in an extended position as shown in Figure 1. The cutter housing and top cover plate 3, together with the ground, form a partial enclosure so that vegetation when mowed is temporarily retained within the area swept by the blades and thus further subjected to shredding or chopping until it finally passes under the cutter housing as the machine moves forward.

In the preferred form the machine rides on a castor type wheel 10 attached in the rear of the housing, the wheel being positioned such that the lower edge of the cutter housing rides above the ground thus allowing the shredded vegetation to pass out from under the machine. The wheel is adjustably mounted so that the housing can be made to ride at any predetermined distance from the ground, thus regulating the size of the space between the ground and the housing walls, through which space the shredded material passes as the machine moves forward. Skids 11 can be attached to the lower edge of the cutter housing on each side of the machine to insure freedom of movement over uneven ground and to prevent the leading edge of the cutter housing from digging into the ground. Normally the skids need not touch the ground when the machine is being used on level ground.

Suitable means for drawing the machine such as by draw bar assembly 12 suitably braced 13 are provided though we do not wish to limit ourselves to a machine drawn by outside force, it being our intention to include a self-propelled machine within the scope of this specification and the attached claims. For use with the conventional farm tractor, the machine can be attached to the tractor through the hydraulic lift thereof, thus permitting the machine to be lifted off the ground should it be convenient to do so.

While we have disclosed and described a preferred form of our invention we do not wish to be limited thereto, it being our intention to include all equivalents and variations which would occur to one skilled in the art within the scope of the invention as defined in this specification and the attached claims.

We claim:

1. A mechanism for cutting and shredding vegetable matter comprising a cutter housing having an arcuate rearward portion and straight side portions extending forwardly therefrom substantially tangent to said arcuate rearward portion, a substantially horizontal top cover plate secured to the upper edge of said housing to form a rearwardly closed forwardly open enclosure therewith, means supporting said housing a predetermined distance above the ground, a shaft mounted in said top cover for rotation about an axis normal to the plane of said top cover plate, said shaft terminating at its lower end above the bottom edge of said housing, blade holding means rigidly secured to said shaft adjacent the lower end thereof, a cutting blade pivotally mounted at each end of said blade holding means, the free ends of said blades being received within said housing, and means for rotating said shaft and said blades whereby said matter initially cut by said blades is retained within said housing and is shredded by said blades until it is of sufficiently small size to pass between the lower edge of said housing and the ground.

2. The cutter mechanism according to claim 1 wherein said means for supporting said housing a predetermined distance above the ground comprises a caster wheel adjustably secured to the rear of said cutter and skids secured to and extending downwardly from the forward edge of said forwardly extending portions of said housing.

FORBY W. LAWRENCE.
ORBY W. LAWRENCE.

References Cited in the file of this patent

UNITED STATES PATENTS

| Number | Name | Date |
|---|---|---|
| 2,281,639 | Swan | May 5, 1942 |
| 2,502,696 | Barnes | Apr. 4, 1950 |
| 2,547,540 | Roberts | Apr. 3, 1951 |
| 2,564,201 | Hainke | Aug. 14, 1951 |

OTHER REFERENCES

Farm Implement News, May 19, 1949, pages 46.